United States Patent Office.

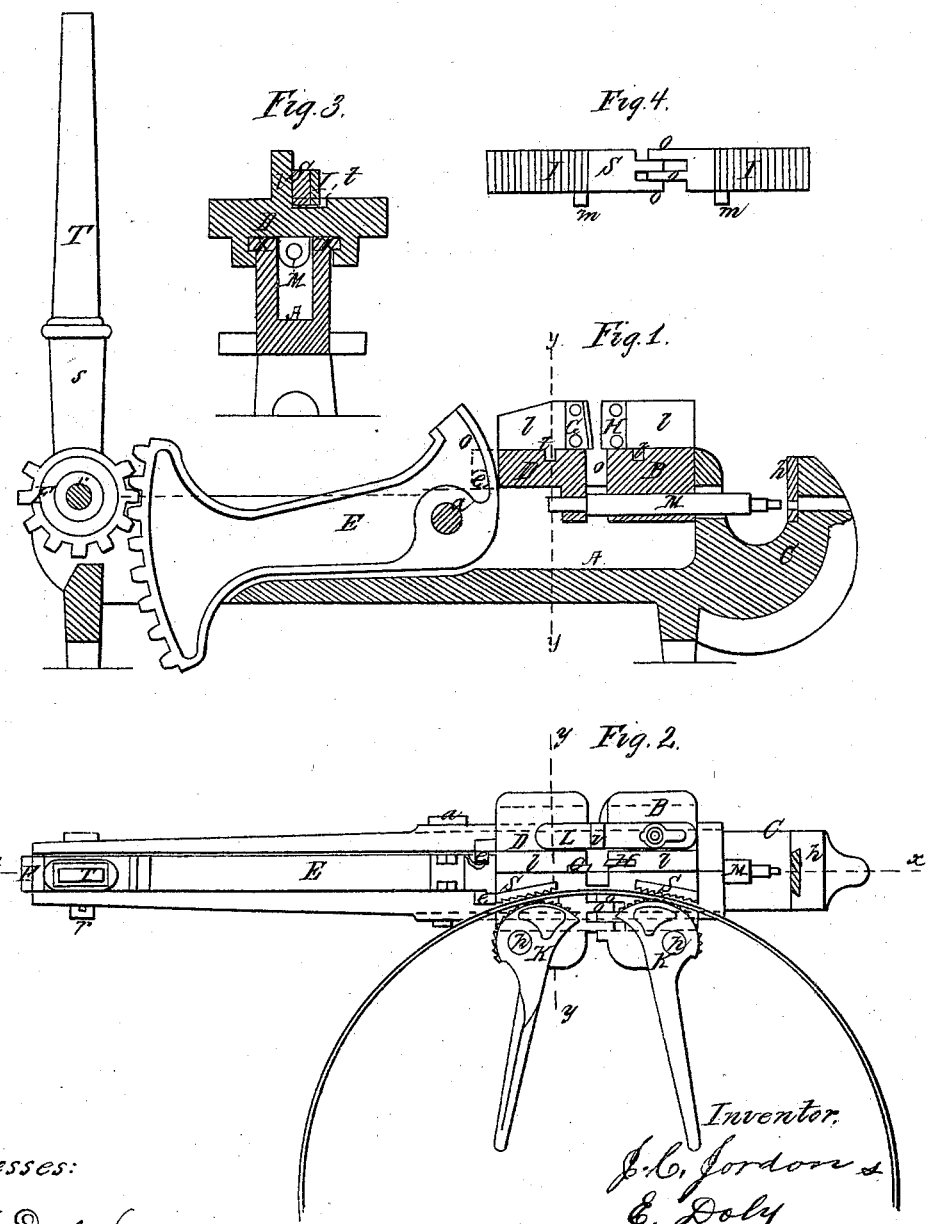

J. C. JORDON, OF WATERTOWN, AND ELLIS DOTY, OF JANESVILLE, ASSIGNORS TO DOTY MANUFACTURING COMPANY, OF JANESVILLE, WISCONSIN.

Letters Patent No. 91,752, dated June 22, 1869.

IMPROVED MACHINE FOR UPSETTING, PUNCHING, AND CUTTING TIRES.

The Schedule referred to in these Letters Patent and making part of the same.

*To all whom it may concern:*

Be it known that we, J. C. JORDON, of Watertown, in the county of Jefferson, and ELLIS DOTY, of Janesville, in the county of Rock, and State of Wisconsin, have invented certain new and useful Improvements in Combined Punching, Shearing, and Upsetting-Machines; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

Our invention relates to the peculiar construction of a combined machine for shearing, punching, and upsetting metal; and consists in the manner of combining and arranging the said parts, so that they may all be operated by one and the same set of levers, &c.; in attaching fingers, to prevent the iron from crimping down while being upset; in providing removable faces or jaws for the clamps of the upsetter, so as to adapt the machine for working either straight or curved iron; and also in attaching a guide or rest for the metal to be sheared, so as to cut across or through it at any desired angle, all as hereinafter described.

Figure 1 is a longitudinal vertical section through the machine, on the line $x-x$ of fig. 2.

Figure 2 is a top-plan view of the machine.

Figure 3, a cross-section on the line $y-y$.

Figure 4, a face view of the detachable jaws.

The machine consists of a hollow iron frame or body, A, of the form shown in the drawings, having mounted upon it a stationary block or head, B, as shown, and a sliding head, D, of corresponding size and shape, the movable head D being operated by means of a lever, E, which is pivoted at $a$, and formed with an eccentric head, $o$, which bears against the rear side of said block D, as shown in figs. 1 and 2, the opposite end of this lever being formed into a curved rack, struck from the point $a$ as a centre.

This lever is, in turn, operated by the cog-pinion F, pivoted at $r$, to which motion is imparted by a hand-lever, T, inserted into the socket $s$, cast upon the rear side of said pinion, all as clearly shown in figs. 1 and 2.

Upon the upper faces of the heads B and D are formed ribs $l$, with vertical faces, as shown in figs. 1 and 3.

Upon the adjacent ends of the said ribs $l$, we secure shear-blades G and H, which are so placed as to project beyond the faces of the heads, and so that the one on the movable head shall play close past the one on the stationary head, as clearly shown in fig. 2.

Upon the heads B and D are stationed vertical studs $p$, and mounted thereon are the cams K, provided with hand-levers, and having their faces serrated, as shown.

These levers are for the purpose of locking the metal to be upset in place on the heads, one of them being made right, and the other left-handed, so as to be self-tightening, as shown in fig. 2.

When the machine is to be used as an upsetter, the lever T is thrown up, drawing the movable head D back by means of the lugs or ears $e$, which are cast upon the back of said head, and pass around over flanges on the side of the eccentric head $o$, as shown in figs. 1 and 2.

The metal is then placed on top of the heads, and locked against the ribs $l$ by the cams K, and the lever T then brought down, forcing the movable head toward the other, and upsetting the metal.

The above arrangement will answer only for straight pieces of metal. When, however, it is required to operate upon bent or curved pieces, as when holding tires flatwise, instead of by their edges, we attach in front of the ribs $l$, wedge-shaped jaws or blocks I, as shown in fig. 3, the jaws I being shown detached in fig. 4, so as to make the face of the clamping-devices conform to the curve or bend of the metal to be worked.

These blocks are held in place by lugs $m$ on their lower sides, which fit into grooves $t$ in the heads, as shown in figs. 1 and 3.

These jaws have their faces serrated or toothed, as shown, so as to hold the metal firmly. They may have placed behind them blocks S, as shown, so as to lessen the space between the jaws and the cams, and thus enable them to hold thinner pieces of metal than could otherwise be done.

To support the metal while being upset, I form, on the front faces of the heads B and D, a series of fingers, coming in line with the upper faces of the said blocks, and those on one head fitting in between those on the other, all as shown in figs. 1 and 2, thus preventing the "crimping" down of the metal, which would interfere and prevent the heads from coming together, and also forming a bed upon which to hammer down the metal. Similar fingers are formed upon the removable jaws, as shown in fig. 4.

The punch is shown clearly in figs. 1, 2, and 3.

The spindle M is inserted into a lug on the under side of the movable head D, and is guided by playing through a rib on the under side of the stationary head B, as shown in fig. 1.

The punch-die is secured in the head C of the main frame, as shown, being inserted into a dovetail slot from above.

To the stationary head B, on the rear side of the rib $l$, is placed a bar, L, long enough to reach across to and rest upon the head D, and held in place by a screwbolt passing down through a slot in its end, as shown in fig. 2.

This bar has on its upper side, near its middle, a vertical stud, $v$.

When shearing, the metal is placed across between the blades, and allowed to rest against the stud, which holds it steady while the shears are acting upon it, and prevents the metal from swinging around when the blades take hold upon it.

By adjusting this slide back and forth, a guide is furnished, which will cause the shears to cut across the iron at any desired angle, or any number of pieces exactly alike.

In constructing our machine, we cast the body A in one piece, and form, on the outside of the body, for a portion of its length, ribs $x$, as shown, and form on the heads B and D flanges, to fit down over them, so that in putting the machine together, it is only necessary to place the heads upon the narrow part of the body, and slide them along until they are brought into the proper positions.

The dies $h$, and the punches $u$, are both made removable, so that punches and dies of various sizes may be used.

By this construction of the various parts, and their combination, we produce a combined machine, especially adapted to the wants of blacksmiths generally, and save the necessity of their buying separate machines for the various purposes for which this is intended.

Having thus fully described our invention.

What we claim, is—

1. The machine, consisting of the frame or body A, cast hollow or slotted, to receive the cam-lever E and pinion F, with the stationary heads B C, and the sliding head D, with the shear-blades and punch applied thereto, and all constructed and arranged to operate substantially as described.

2. The detachable wedge-shaped blocks S, recessed to receive the detachable jaws I, and provided with lugs, to hold them in place upon the heads B and D, substantially as and for the purpose set forth.

3. The adjustable rest $v$, secured to the head B, substantially as and for the purpose herein set forth.

J. C. JORDON.
ELLIS DOTY.

Witnesses:
CHARLES VINEY,
E. P. DOTY.